(12) United States Patent
Bansyo et al.

(10) Patent No.: US 11,167,557 B2
(45) Date of Patent: Nov. 9, 2021

(54) AGITATION DEVICE CONFIGURED TO EXECUTE TRANSFER OPERATION AND AGITATION OPERATION OF LIQUID

(71) Applicant: RISO KAGAKU CORPORATION, Tokyo (JP)

(72) Inventors: Toshihiro Bansyo, Ibaraki (JP); Takehiro Yamori, Ibaraki (JP)

(73) Assignee: RISO KAGAKU CORPORATION, Tokyo (JP)

( * ) Notice: Subject to any disclaimer, the term of this patent is extended or adjusted under 35 U.S.C. 154(b) by 0 days.

(21) Appl. No.: 16/791,213

(22) Filed: Feb. 14, 2020

(65) Prior Publication Data

US 2020/0269587 A1    Aug. 27, 2020

(30) Foreign Application Priority Data

Feb. 27, 2019    (JP) .............................. JP2019-033828

(51) Int. Cl.
| | |
|---|---|
| *B41J 2/18* | (2006.01) |
| *B41J 2/175* | (2006.01) |
| *B41J 2/185* | (2006.01) |
| *C09D 11/322* | (2014.01) |

(52) U.S. Cl.
CPC ........... *B41J 2/17513* (2013.01); *B41J 2/175* (2013.01); *B41J 2/17596* (2013.01); *B41J 2/185* (2013.01); *C09D 11/322* (2013.01)

(58) Field of Classification Search
None
See application file for complete search history.

(56) References Cited

U.S. PATENT DOCUMENTS

| | | | |
|---|---|---|---|
| 2005/0212874 A1* | 9/2005 | Nomura | B41J 2/17503 347/84 |
| 2015/0360190 A1* | 12/2015 | Sakai | B01F 5/10 366/153.1 |
| 2017/0320331 A1* | 11/2017 | Alessi | B41J 2/175 |
| 2019/0224982 A1* | 7/2019 | Miyazaki | B41J 2/18 |
| 2019/0299626 A1* | 10/2019 | Shimizu | B41J 2/185 |

FOREIGN PATENT DOCUMENTS

| | | | | |
|---|---|---|---|---|
| JP | 2017-065077 A | | 4/2017 | |
| JP | 6429160 B2 | * | 11/2018 | ................ B41J 2/18 |
| WO | WO-2020040768 A1 | * | 2/2020 | .......... B41J 2/17509 |

* cited by examiner

*Primary Examiner* — Shelby L Fidler
(74) *Attorney, Agent, or Firm* — Greenblum & Bernstein, P.L.C.

(57) ABSTRACT

An agitation device includes: a first container configured to house a liquid; a second container configured to house the liquid transferred from the first container; a transfer agitation unit configured to selectively execute a transfer operation of transferring the liquid from the first container to the second container and an agitation operation of agitating the liquid in the second container by using a common drive source; and a controller configured to control the transfer agitation unit to alternately execute the transfer operation and the agitation operation upon transferring the liquid from the first container to the second container.

8 Claims, 3 Drawing Sheets

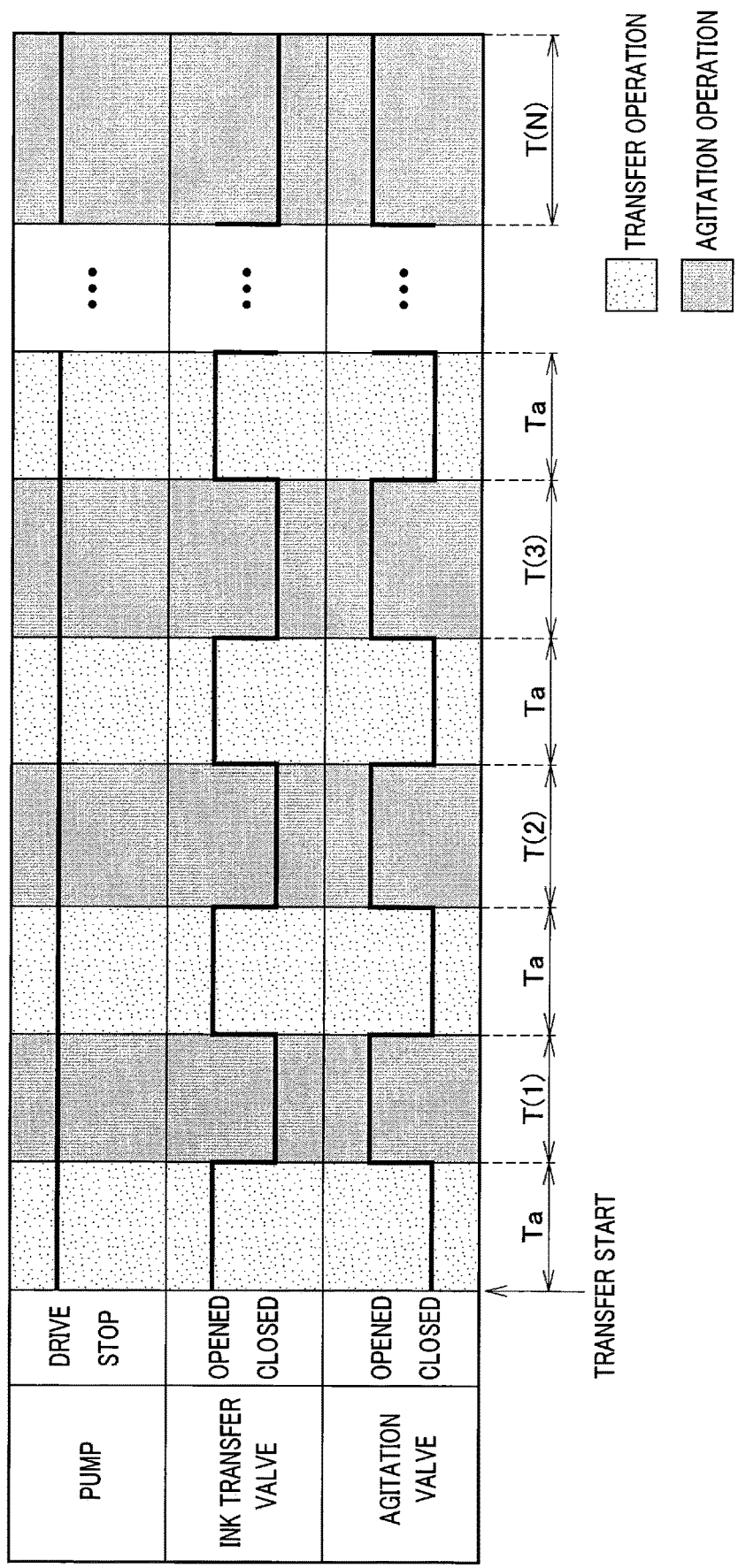

AGITATION DEVICE CONFIGURED TO EXECUTE TRANSFER OPERATION AND AGITATION OPERATION OF LIQUID

CROSS REFERENCE TO RELATED APPLICATION

This application is based upon and claims the benefit of priority from the prior Japanese Patent Application No. 2019-033828, filed on Feb. 27, 2019, the entire contents of which are incorporated herein by reference.

BACKGROUND

1. Technical Field

The disclosure relates to an agitation device configured to agitate liquid.

2. Related Art

An inkjet printing apparatus sometimes uses pigment ink. When the pigment ink is left at rest, sedimentation of pigment particles may occur in the pigment ink. The sedimentation of pigment particles is likely to occur particularly in ink containing pigment with large specific gravity such as metal particles.

The sedimentation of pigment particles in the ink may lead to ejection failures in an inkjet head due to an increase in viscosity of the ink. Moreover, the sedimentation of pigment particles in the ink may cause variation in the concentration of the ink ejected from the inkjet head. A device disclosed in Japanese Patent Application Publication No. 2017-65077 agitates the ink to prevent such defects caused by the sedimentation of pigment particles.

In this relation, for avoiding the sedimentation of pigment particles in ink in an ink cartridge, there is known a technique of transferring the ink in the ink cartridge to a tank for agitation provided in an inkjet printing apparatus and agitating the ink in the tank.

Moreover, in this technique, there is known a configuration in which a common pump is used to perform an operation of transferring the ink from the ink cartridge to the tank and an operation of agitating the ink in the tank to simplify the configuration of the apparatus.

SUMMARY

In the configuration in which the common pump is used to perform the transfer operation and the agitation operation of the ink as described above, the transfer operation and the agitation operation cannot be performed in parallel and the agitation operation is performed after the completion of the transfer of the ink from the ink cartridge to the tank. Accordingly, the agitation of the ink starts from the state where ink in an amount equivalent to one ink cartridge is housed in the tank and sufficient agitation of the ink takes long time.

The disclosure is directed to an agitation device which can reduce time required to agitate ink.

An agitation device in accordance with some embodiments includes: a first container configured to house a liquid; a second container configured to house the liquid transferred from the first container; a transfer agitation unit configured to selectively execute a transfer operation of transferring the liquid from the first container to the second container and an agitation operation of agitating the liquid in the second container by using a common drive source; and a controller configured to control the transfer agitation unit to alternately execute the transfer operation and the agitation operation upon transferring the liquid from the first container to the second container.

According to the aforementioned configuration, time required to agitate the liquid can be reduced.

BRIEF DESCRIPTION OF DRAWINGS

FIG. 3 is a timing chart of operations of a pump, an ink transfer valve, and an agitation valve in the processing of the flowchart of FIG. 2.

DETAILED DESCRIPTION

Figure 1:
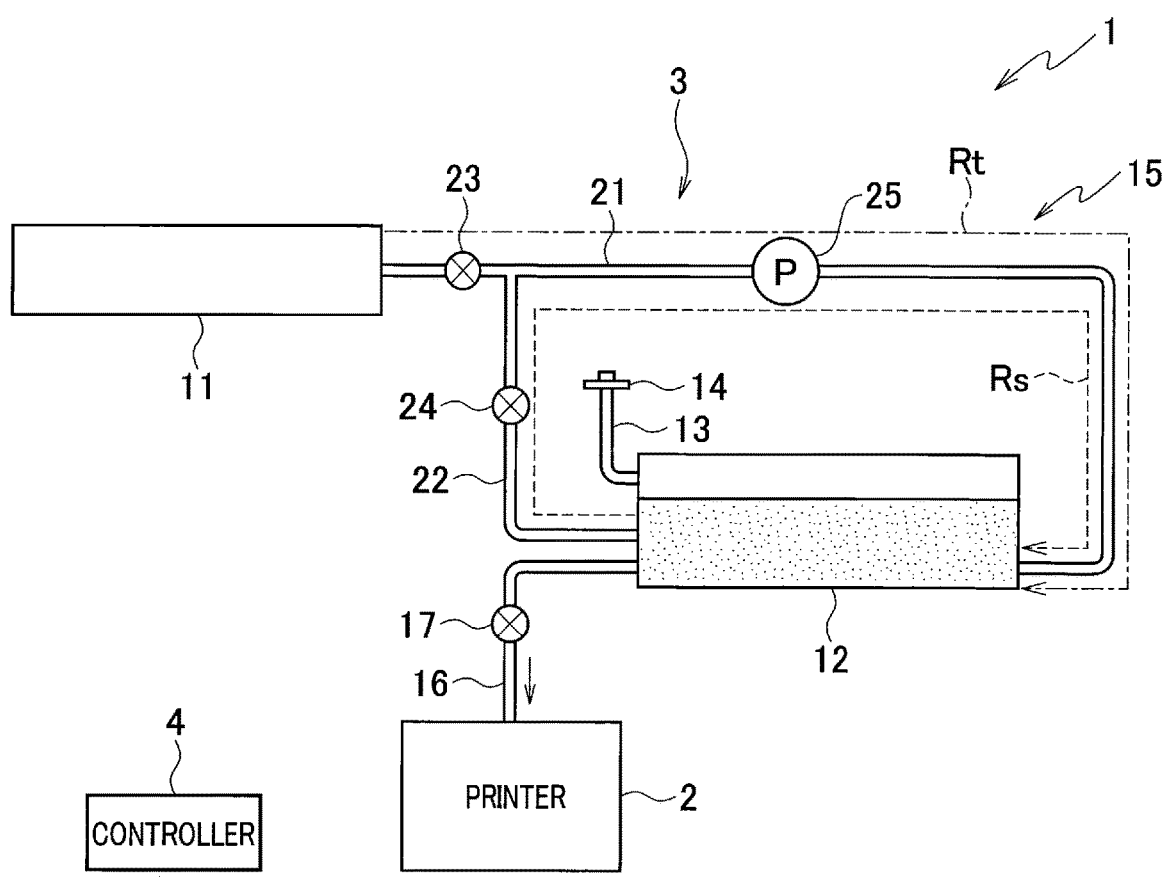
FIG. 1 is a schematic configuration diagram of a printing apparatus according to an embodiment.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Description will be hereinbelow provided for embodiments of the present invention by referring to the drawings. It should be noted that the same or similar parts and components throughout the drawings will be denoted by the same or similar reference signs, and that descriptions for such parts and components will be omitted or simplified. In addition, it should be noted that the drawings are schematic and therefore different from the actual ones.

FIG. 1 is a schematic configuration diagram of a printing apparatus provided with an agitation device according to an embodiment. As illustrated in FIG. 1, the printing apparatus 1 according to the embodiment includes a printer 2, an ink supplier 3, and a controller 4. Note that part (ink cartridge 11, tank 12, and transfer agitation unit 15 to be described later) of the ink supplier 3 and the controller 4 form the agitation device.

The printer 2 includes an inkjet head (not illustrated) and prints an image by ejecting ink from the inkjet head to a sheet.

The ink supplier 3 agitates the ink (liquid) and supplies the ink to the printer 2. The ink supplier 3 includes the ink cartridge (first container) 11, the tank (second container) 12, an atmosphere opening pipe 13, an air filter 14, the transfer agitation unit 15, an ink supply pipe 16, and an ink supply valve 17.

The ink used in the printing in the printing apparatus 1 is pigment ink and is ink in which sedimentation of pigment particles may occur when the ink is left at rest. For example, the ink used in the printing in the printing apparatus 1 is a Magnetic Ink Character Reader (MICR) ink containing metal particles which are magnetic bodies. The sedimentation of the pigment particles of the ink leads to defects such as ejection failure in the inkjet head and variation in the concentration of the ejected ink. Since the sedimentation of the pigment particles of the ink may have occurred in the ink cartridge 11, in the printing apparatus 1, the ink is agitated in the ink supplier 3 to avoid the sedimentation of the pigment particles if any.

The ink cartridge 11 houses the pigment ink which is the ink to be used for printing by the printer 2. The ink cartridge 11 is configured to be detachably attached to the printing apparatus 1.

The tank 12 houses the ink transferred from the ink cartridge 11 for agitation.

The atmosphere opening pipe 13 forms a flow path of air which opens the tank 12 to the atmosphere. One end of the atmosphere opening pipe 13 is connected to the tank 12 and the other end communicates with the atmosphere via the air filter 14. The air filter 14 prevents dust and the like in the air from entering the atmosphere opening pipe 13.

The transfer agitation unit 15 selectively performs a transfer operation of transferring the ink from the ink cartridge 11 to the tank 12 and an agitation operation of agitating the ink in the tank 12. The transfer agitation unit 15 includes an ink transfer pipe 21, an ink flow-out pipe 22, an ink transfer valve 23, an agitation valve 24, and a pump (drive source) 25.

The ink transfer pipe 21 connects the ink cartridge 11 and the tank 12. The ink transfer pipe 21 forms a transfer route Rt which is a route through which the ink is transferred from the ink cartridge 11 to the tank 12.

The ink flow-out pipe 22 connects the tank 12 and the ink transfer pipe 21.

The ink flow-out pipe 22 and a portion of the ink transfer pipe 21 on the tank 12 side of a point where the ink flow-out pipe 22 is connected form an agitation route Rs. The agitation route Rs is a route through which the ink flows out from the tank 12 and returns to the tank 12.

The ink transfer valve 23 opens and closes a flow path of the ink in the ink transfer pipe 21. The ink transfer valve 23 is arranged in a portion of the ink transfer pipe 21 on the ink cartridge 11 side of the point where the ink flow-out pipe 22 is connected.

The agitation valve 24 opens and closes a flow path of the ink in the ink flow-out pipe 22.

The ink transfer valve 23 and the agitation valve 24 switch the route to be opened between the transfer route Rt and the agitation route Rs. Specifically, opening the ink transfer valve 23 and closing the agitation valve 24 sets the transfer route Rt to an opened state and the agitation route Rs to a closed state. Moreover, closing the ink transfer valve 23 and opening the agitation valve 24 sets the agitation route Rs to an opened state and the transfer route Rt to a closed state.

The pump 25 agitates the ink in the tank 12 by sending the ink such that the ink flows out from the tank 12 and returns to the tank 12 via the agitation route Rs. Moreover, the pump 25 is used to transfer the ink from the ink cartridge 11 to the tank 12 via the transfer route Rt. Specifically, the pump 25 is used as a common drive source for the transfer operation and the agitation operation in the transfer agitation unit 15.

The pump 25 is arranged in a portion shared by the transfer route Rt and the agitation route Rs. Specifically, the pump 25 is arranged in the portion of the ink transfer pipe 21 on the tank 12 side of the connection point with the ink flow-out pipe 22.

The ink supply pipe 16 connects the tank 12 and the printer 2.

The ink supply valve 17 opens and closes a flow path of the ink in the ink supply pipe 16. When the ink supply valve 17 is opened, the ink is supplied from the tank 12 to the printer 2.

The controller 4 controls operations of the units in the printing apparatus 1. The controller 4 includes a CPU, a RAM, a ROM, a hard disk drive, and the like.

Specifically, the controller 4 performs control of printing on a sheet with the printer 2 while supplying the ink from the ink supplier 3 to the printer 2. Moreover, when the liquid surface level of the ink in the tank 12 reaches or falls below a predetermined lower limit level, the controller 4 controls the transfer agitation unit 15 such that the transfer agitation unit 15 transfers the ink from the ink cartridge 11 to the tank 12. In this case, the controller 4 controls the transfer agitation unit 15 such that the transfer agitation unit 15 alternately performs the transfer operation and the agitation operation.

Next, operations of the printing apparatus 1 are described.

When printing is to be performed, the controller 4 causes the ink to be ejected from the inkjet head of the printer 2 to a sheet. The ink is thereby consumed and, when supplying of ink to the printer 2 becomes necessary, the controller 4 opens the ink supply valve 17. When the ink supply valve 17 is opened, the ink is supplied from the tank 12 to the printer 2 via the ink supply pipe 16. When the necessary amount of ink is supplied, the controller 4 closes the ink supply valve 17.

Supplying of the ink to the printer 2 causes the ink in the tank 12 to decrease and the liquid surface of the ink drops. When a sensor (not illustrated) detects that the liquid surface level of the ink in the tank 12 reaches or falls below the lower limit level, the controller 4 determines that there is no ink in the tank 12 and closes the ink supply valve 17.

Then, the controller 4 executes the transfer of the ink from the ink cartridge 11 to the tank 12. Operations in the transfer of the ink from the ink cartridge 11 to the tank 12 are described with reference to the flowchart of FIG. 2.

Figure 2:
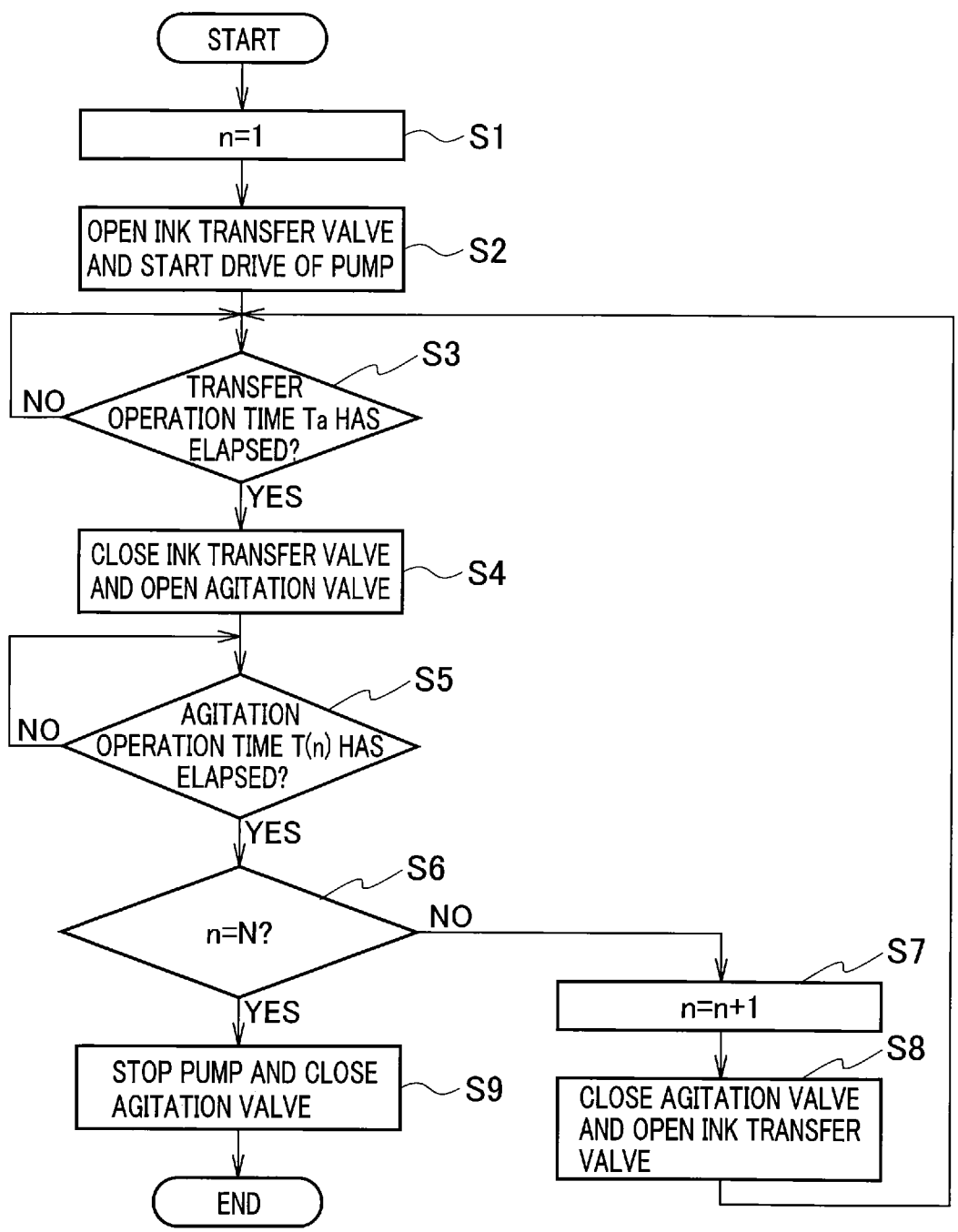
FIG. 2 is a flowchart for explaining operations in transfer of ink from an ink cartridge to a tank according to the embodiment.

In step S1 of FIG. 2, the controller 4 sets a variable n indicating the sequential number of the transfer operation and the agitation operation to "1."

Next, in step S2, the controller 4 opens the ink transfer valve 23 and starts drive of the pump 25.

In this case, in a state just before the start of the ink transfer from the ink cartridge 11 to the tank 12, the ink transfer valve 23 and the agitation valve 24 are both closed. Moreover, the new ink cartridge 11 is attached to the printing apparatus 1.

Opening the ink transfer valve 23 from the state where the ink transfer valve 23 and the agitation valve 24 are closed sets the agitation route Rs to the closed state and the transfer route Rt to the opened state. Starting the drive of the pump 25 in this state starts the first transfer operation and the ink starts to be transferred from the ink cartridge 11 to the tank 12 through the transfer route Rt. The pump 25 in the embodiment is a unit which sends the ink at a fixed liquid sending performance in the transfer operation and the agitation operation.

Next, in step S3, the controller 4 determines whether a predetermined transfer operation time Ta has elapsed from the start of the n-th transfer operation. The transfer operation time Ta is set in advance as time required to transfer a predetermined amount ink in one transfer operation. When the controller 4 determines that the transfer operation time Ta has not elapsed from the start of the n-th transfer operation (step S3: NO), the controller 4 repeats step S3.

When the controller 4 determines that the transfer operation time Ta has elapsed from the start of the n-th transfer operation (step S3: YES), in step S4, the controller 4 closes the ink transfer valve 23 and opens the agitation valve 24. Switching to the state where the agitation route Rs is opened and the transfer route Rt is closed is thereby performed. In this case, the pump 25 is continuously driven and the ink thereby starts to be circulated through the agitation route Rs.

The n-th transfer operation is thereby completed and the n-th agitation operation is started to start the agitation of the ink in the tank 12.

Next, in step S5, the controller 4 determines whether a predetermined agitation operation time T(n) has elapsed from the start of the n-th agitation operation.

In this case, the agitation operation time T(n) is set in advance as a time of the n-th agitation operation. The agitation operation time T(n) is set as time required to agitate the ink in the tank 12 depending on the amount of ink in the tank 12 at a moment of (a start of) the n-th agitation operation (at the completion of the n-th transfer operation). The greater the amount of ink in the tank 12 in the agitation operation is, the longer the time required to sufficiently agitate the ink in the tank 12 is. Accordingly, the agitation operation time T(n) becomes longer depending on an increase in the amount of ink in the tank 12, that is an increase of n. Note that the amount of ink in the tank 12 in the n-th agitation operation can be calculated by adding up the transfer amounts of the ink in the respective transfer operations up to the n-th transfer operation.

Moreover, the agitation operation time T(n) is adjusted depending on the type of ink. Specifically, the agitation operation time T(n) is adjusted such that a longer agitation operation time T(n) is set for the type of ink hard to agitate. More specifically, the agitation operation time T(n) is adjusted such that, for example, a longer agitation operation time T(n) is set for the type of ink with a higher viscosity. Moreover, the agitation operation time T(n) is adjusted such that, for example, a longer the agitation operation time T(n) is set for the type of ink in which the dispersibility (mixability) of the pigment particles of the ink to a solvent is lower.

The controller 4 stores in advance the agitation operation time T(n) (n=1, 2, ...) for each type of ink and, in step S5, uses the agitation operation time T(n) corresponding to the type of the ink in the ink cartridge 11 currently attached to the printing apparatus 1.

When the controller 4 determines that the agitation operation time T(n) has not elapsed from the start of the n-th agitation operation (step S5: NO), the controller 4 repeats step S5.

When the controller 4 determines that the agitation operation time T(n) has elapsed from the start of the n-th agitation operation (step S5: YES), in step S6, the controller 4 determines whether the variable n is "N" indicating the last transfer operation and the last agitation operation. In this case, N is an integer of 2 or more.

When the controller 4 determines that n is not N (step S6: NO), in step S7, the controller 4 adds "1" to the variable n.

Next, in step S8, the controller 4 closes the agitation valve 24 and opens the ink transfer valve 23. Switching to the state where the agitation route Rs is closed and the transfer route Rt is opened is thereby performed and the ink starts to be transferred from the ink cartridge 11 to the tank 12 through the transfer route Rt. Specifically, the (n−1)th agitation operation is completed and the n-th transfer operation is started. Then, the controller 4 returns to step S3.

When the controller 4 determines that n is N in step S6 (step S6: YES), in step S9, the controller 4 stops the pump and closes the agitation valve 24. The last (N-th) agitation operation is thereby completed and the series of operations is completed.

A combination of operations of performing the transfer operation and then the agitation operation is repeated multiple times (N times) as illustrated in FIG. 3 by performing the processing of the flowchart of FIG. 2 as described above and the transfer operation and the agitation operation are thereby alternately and repeatedly performed. Moreover, the agitation operation time T(n) of each agitation operation is such that $T(1)<T(2)< \ldots <T(N)$. When the last (N-th) agitation operation is completed, all ink in the ink cartridge 11 is transferred to the tank 12 and the ink in the tank 12 is sufficiently agitated.

As described above, in the printing apparatus 1, when the ink is transferred from the ink cartridge 11 to the tank 12, the controller 4 controls the transfer agitation unit 15 such that the transfer agitation unit 15 alternately performs the transfer operation and the agitation operation. Repeating the operation of partially transferring the ink in the ink cartridge 11 to the tank 12 and then agitating the ink in the tank 12 improves the agitation efficiency from that in the case where all ink in the ink cartridge 11 is transferred to the tank 12 and then agitated. As a result, the time required to agitate the ink can be reduced.

Moreover, in the printing apparatus 1, the controller 4 sets the agitation operation time T(n) depending on the amount of ink in the tank 12 at the moment of each agitation operation. This suppresses the case where the agitation operation is performed for an unnecessarily long time and the time required to agitate the ink can be thus further reduced.

Furthermore, in the printing apparatus 1, the controller 4 adjusts the agitation operation time T(n) depending on the type of ink. This suppress the case where a certain type of ink transferred from the ink cartridge 11 to the tank 12 is subjected to the agitation operation for an unnecessarily long time and the time required to agitate the ink becomes longer. Moreover, this suppresses the case where the time of the agitation operation is too short and the ink is insufficiently agitated.

Although the agitation operation time T(n) is adjusted depending on the type of ink in the aforementioned embodiment, the agitation operation time T(n) to be used may be set irrespective of the type of ink. In this case, for example, the agitation operation time T(n) may be set to a time required to agitate the ink in the tank 12 depending on the amount of the ink in the tank 12 at the moment of the agitation operation in the case where the ink in the ink cartridge 11 is a type of ink which is the hardest to agitate among the types of inks usable in the printing apparatus 1.

Moreover, although the agitation operation time T(n) is set depending on the amount of ink in the tank 12 at the moment of the agitation operation in the aforementioned embodiment, the agitation operation time T(n) may be fixed irrespective of the amount of ink in the tank 12 at the moment of the agitation operation.

In this case, the agitation operation time T(n) in each agitation operation may be set to a time in which the ink in the tank 12 can be sufficiently agitated in the last agitation operation. Moreover, in this case, the agitation operation time T(n) may be adjusted depending on the type of ink or a fixed agitation operation time T(n) usable irrespective of the type of ink may be set. When the fixed agitation operation time T(n) usable irrespective of the type of ink is set, the agitation operation time T(n) in each agitation operation may be set to the time in which the ink in the tank 12 can be sufficiently agitated in the last agitation operation in the case where the ink of the ink cartridge 11 is the type of ink hardest to agitate among the types usable in the printing apparatus 1.

Also when the agitation operation time T(n) is fixed as described above, it is possible to improve the agitation efficiency and reduce the time required to agitate the ink from those in the case where all ink in the ink cartridge 11 is transferred to the tank 12 and then agitated.

Furthermore, although the transfer operation time Ta in each transfer operation is fixed in the aforementioned embodiment, the present invention is not limited to this and, for example, the transfer operation time may vary among the transfer operations.

Moreover, although the case where the ink in which sedimentation of pigment particles occurs is agitated is described in the aforementioned embodiment, the ink to be agitated is not limited to the ink in which sedimentation of contents occurs and may be, for example, ink in which separation of contents occurs.

Furthermore, although the tank 12 is described as a configuration which houses the ink transferred from the ink cartridge 11 for agitation in the aforementioned embodiment, the configuration which houses the ink for agitation is not limited to this. For example, a flexible pack may be used.

Moreover, the present invention can be also applied to a device which agitates liquid other than ink.

The embodiment of the disclosure has, for example, the following configuration.

An agitation device includes: a first container configured to house a liquid; a second container configured to house the liquid transferred from the first container; a transfer agitation unit configured to selectively execute a transfer operation of transferring the liquid from the first container to the second container and an agitation operation of agitating the liquid in the second container by using a common drive source; and a controller configured to control the transfer agitation unit to alternately execute the transfer operation and the agitation operation upon transferring the liquid from the first container to the second container.

The controller may be configured to determine time of each agitation operation depending on an amount of the liquid in the second container at a start of each agitation operation.

The controller may be configured to determine time of each agitation operation depending on a type of the liquid.

Embodiments of the present invention have been described above. However, the invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

Moreover, the effects described in the embodiments of the present invention are only a list of optimum effects achieved by the present invention. Hence, the effects of the present invention are not limited to those described in the embodiment of the present invention.

What is claimed is:

1. An agitation device comprising:
a first container configured to house a liquid;
a second container configured to house the liquid transferred from the first container;
a transfer agitation unit configured to selectively execute a transfer operation of transferring the liquid from the first container to the second container and an agitation operation of agitating the liquid in the second container by using a common drive source; and
a controller configured to control the transfer agitation unit to alternately execute the transfer operation and the agitation operation upon transferring the liquid from the first container to the second container, wherein
the controller controls the transfer agitation unit to alternately execute the transfer operation and the agitation operation based on a predetermined transfer operation time set in advance of the transfer operation and a predetermined agitation operation time set in advance of the agitation operation.

2. The agitation device according to claim 1, wherein the controller is configured to determine time of each agitation operation depending on an amount of the liquid in the second container at a start of each agitation operation.

3. The agitation device according to claim 1, wherein the controller is configured to determine time of each agitation operation depending on a type of the liquid.

4. The agitation device according to claim 2, wherein the controller is configured to determine the time of each agitation operation depending on a type of the liquid.

5. The agitation device according to claim 1, wherein
the controller sets in advance of the transfer operation the predetermined transfer operation time for the transfer operation and after which the agitation operation starts,
the controller sets in advance of the agitation operation the predetermined agitation operation time for the agitation operation and after which the transfer operation begins again or the transfer operation and the agitation operation stop,
the controller starts the transfer operation after identifying the transfer operation as a first transfer operation to be performed, and
the controller stops the first transfer operation and starts a first agitation operation when the controller determines that the predetermined transfer operation time has elapsed since the start of the first transfer operation, and the controller stops the first agitation operation when the controller determines that the predetermined agitation operation time has elapsed, thereby controlling the starting and stopping of the transfer operation and the agitation operation, and controlling the alternating of the transfer operation and the agitation operation based only on the predetermined transfer operation time and the predetermined agitation operation time.

6. The agitation device according to claim 5, wherein
the controller determines whether the first transfer operation and the first agitation operation are the last transfer and agitation operations to be performed, resulting in all of the ink in the first container being transferred to the second container,
the controller stops the first agitation operation by stopping the common drive source when the controller determines that the first transfer operation and the first agitation operation are the last transfer and agitation operations to be performed,
the controller alternately performs additional transfer and agitation operations when the controller determines that the first transfer operation and the first agitation operation not the last transfer and agitation operations to be performed, and
the controller stops performing the additional transfer and agitation operations when the controller determines that the last transfer and agitation operations are performed.

7. The agitation device according to claim 5, wherein
the controller sets a variable "n" indicating a number of times the transfer operation and the agitation operation are performed to 1, the controller starts a first transfer operation after setting the number of times the transfer operation and the agitation operation are performed to 1, the controller determines whether the number "n" of times the transfer operation and the agitation operation have been performed is "N," indicating the last transfer operation and the last agitation operation to be performed, resulting in all of the ink in the first container being transferred to the second container, after the predetermined agitation operation time has elapsed, the controller stops the first agitation operation by stopping the common drive source when the controller determines that the number "n" of times the transfer operation and the agitation operation have been performed is "N," indicating the last transfer operation and the last agitation operation have been performed, resulting in all of the ink in the first container being transferred to the second container, the controller increases the variable "n" by 1 and performs a second transfer operation and thereafter a second agitation operation when the controller determines that the number "n" of times the transfer operation and the agitation operation have been performed is not "N," indicating the first transfer operation and the first agitation operation are not the last transfer and agitation operations to be performed, and the controller stops performing additional transfer and agitation operations when the controller determines that the number "n" of times the transfer operation and the agitation operation have been performed is "N".

8. The agitation device according to claim 5, wherein the first container is an ink cartridge separately detachably attachable to a printing apparatus, and wherein the device further comprises a liquid supply pipe directly connecting the second container to the printing apparatus.

* * * * *

UNITED STATES PATENT AND TRADEMARK OFFICE
CERTIFICATE OF CORRECTION

PATENT NO. : 11,167,557 B2  
APPLICATION NO. : 16/791213  
DATED : November 9, 2021  
INVENTOR(S) : T. Bansyo et al.

It is certified that error appears in the above-identified patent and that said Letters Patent is hereby corrected as shown below:

In the Claims

At Column 8, Line 57 (Claim 6, Line 15), please change "operation not" to -- operation are not --.

Signed and Sealed this  
Twenty-ninth Day of March, 2022

Drew Hirshfeld  
*Performing the Functions and Duties of the*  
*Under Secretary of Commerce for Intellectual Property and*  
*Director of the United States Patent and Trademark Office*